United States Patent
Odom et al.

(10) Patent No.: US 6,370,534 B1
(45) Date of Patent: Apr. 9, 2002

(54) BLOCKING TECHNIQUES FOR DATA STORAGE

(75) Inventors: Paul S. Odom; Michael J. Massey, both of Houston, TX (US)

(73) Assignee: Pliant Technologies, Inc., Houston, TX (US)

( * ) Notice: Subject to any disclaimer, the term of this patent is extended or adjusted under 35 U.S.C. 154(b) by 0 days.

(21) Appl. No.: 09/324,090

(22) Filed: Jun. 1, 1999

(51) Int. Cl.$^7$ .............................................. G06F 17/30
(52) U.S. Cl. ....................... 707/100; 707/100; 707/101; 707/102; 707/103; 707/104
(58) Field of Search ................. 707/100, 101, 707/102, 103, 104

(56) References Cited

U.S. PATENT DOCUMENTS

| | | | | |
|---|---|---|---|---|
| 5,325,496 A | * | 6/1994 | Hays et al. ................... | 395/400 |
| 5,706,491 A | * | 1/1998 | McMahan ..................... | 395/581 |
| 5,729,730 A | * | 3/1998 | Wlaschin et al. .............. | 707/3 |
| 5,752,243 A | * | 5/1998 | Reiter et al. ................... | 707/3 |
| 5,790,848 A | * | 8/1998 | Wlaschin ...................... | 707/104 |
| 5,850,522 A | * | 12/1998 | Wlaschin ............... | 395/200.45 |
| 5,893,087 A | * | 4/1999 | Wlaschin et al. .............. | 707/3 |
| 5,970,494 A | * | 10/1999 | Velissaropoulos et al. .. | 707/102 |
| 6,061,690 A | * | 5/2000 | Nori et al. ................... | 707/103 |
| 6,128,621 A | * | 10/2000 | Weisz .......................... | 707/103 |
| 6,182,121 B1 | * | 1/2001 | Wlaschin ..................... | 709/215 |

OTHER PUBLICATIONS

Maurice J. Bach, "The Design Of The Unix Operating System," 1990, pp. 60–90, Prentice–Hall, Inc., Englewood Cliffs, New Jersey, US.

* cited by examiner

*Primary Examiner*—Frantz Coby
(74) *Attorney, Agent, or Firm*—Coe F. Miles

(57) ABSTRACT

Methods to store a first data structure having zero or more fixed-length data items and a reference to a second data structure are described. The second data structure having a variable-length data item (indicated by the reference) may also be stored in the memory. In addition, methods to validate and repair a pointer element having a file identification portion and a file offset portion are described. The methods include determining if the file identification portion indicates an allocated file and indicating an invalid pointer condition if the file identification portion indicates an unallocated file, else determining if the file offset portion indicates an allocated block in the allocated file, and indicating an invalid pointer condition if the file offset portion indicates an unallocated block. The described methods may be stored in any media that is readable and executable by a programmable control device.

32 Claims, 7 Drawing Sheets

BLOCKING TECHNIQUES FOR DATA STORAGE

BACKGROUND

The invention relates generally to data storage and, more particularly, to blocking techniques for data storage and run-time error recovery capability.

As organizations have embraced computer technology, the use of database management systems to store, organize, and manipulate information has increased rapidly. As used herein, a database management system is a computerized record-keeping system to manage one or more databases. A database may be defined as a collection of shared operational data stored on one or more storage units. Illustrative storage units include, but are not limited to, magnetic and optical disk units.

Referring to FIG. 1, operational data 100 may include data element 102 and index element 104. Data element 102 represents a collection of data organized into records (e.g., record 106). Each record, in turn, may include one or more fields (e.g., fields F1 through F5). For example, record 106 may represent an employee record whose fields are defined in Table 1 below. Index element 104 represents a collection of one or more keys, each of which identifies a unique record or data field (e.g., employee number 108) in data element 102.

TABLE 1

Example Data Record

| Field | Name | Type |
|---|---|---|
| F1 108 | Employee Number | Numeric (Fixed) |
| F2 110 | Last Name | Text (Variable) |
| F3 112 | First Name | Text (Variable) |
| F4 114 | Address | Text (Variable) |
| F5 116 | Employment Date | Date (Fixed) |

Typically, records (e.g., record 106) accommodate variable size data in one of two ways. First, the size of each field within a record may be fixed to allow for the maximum expected entry. Alternatively, the size of individual fields may be allowed to vary from record to record. Using the first method, storage space may be wasted by those records whose entries do not use all of the specified storage. Using the second method, the complexity of storage, retrieval, backup, and error correction operations may be increased. For example, storage of variable size records makes it impractical determine a priori where a record may be stored on physical media. Thus, prefetch techniques (which bring data into main memory before it is actually processed) applied to variable length records may provide little, if any, improved access speed.

For example, if one or more fields within a record (e.g., record 106) becomes damaged (corrupted) during database operations, the damaged field(s) may be restored from backup media. If one or more records within index element 104 becomes corrupted, the index may be rebuilt using the relevant records and field data in data element 102. Both data backup and index reconstruction operations may be computationally and time intensive tasks (especially for large databases) that either limit or prevent access to data 102 and/or indexes 104 during their operation.

Thus, it would be beneficial to provide techniques to improve the storage, retrieval, and error correction capability of database operational data.

SUMMARY

In one embodiment the invention provides a method to store data in a memory. The method includes storing a first data structure in a memory, the first data structure including only zero or more fixed-length data items and a reference to a second data structure. The method further including storing the second data structure in the memory, the second data structure including a variable-length data item indicated by the reference. In another embodiment of the invention, the invention comprises the data structures used by the described method. In yet another embodiment, the method may be stored in any media that is readable and executable by a programmable control device.

In still further embodiments, methods to validate and repair a pointer element having a file identification portion and a file offset portion are described. The methods include determining if the file identification portion indicates an allocated file and indicating an invalid pointer condition if the file identification portion indicates an unallocated file, else determining if the file offset portion indicates an allocated block in the allocated file, and indicating an invalid pointer condition if the file offset portion indicates an unallocated block. The described pointer validation and/or repair methods may be stored in any media that is readable and executable by a programmable control device.

DETAILED DESCRIPTION

Blocking techniques (including methods and devices) for data storage and run-time error correction capability for a database are described. The following embodiments of the invention are illustrative only and are not to be considered limiting in any respect.

Figure 2:
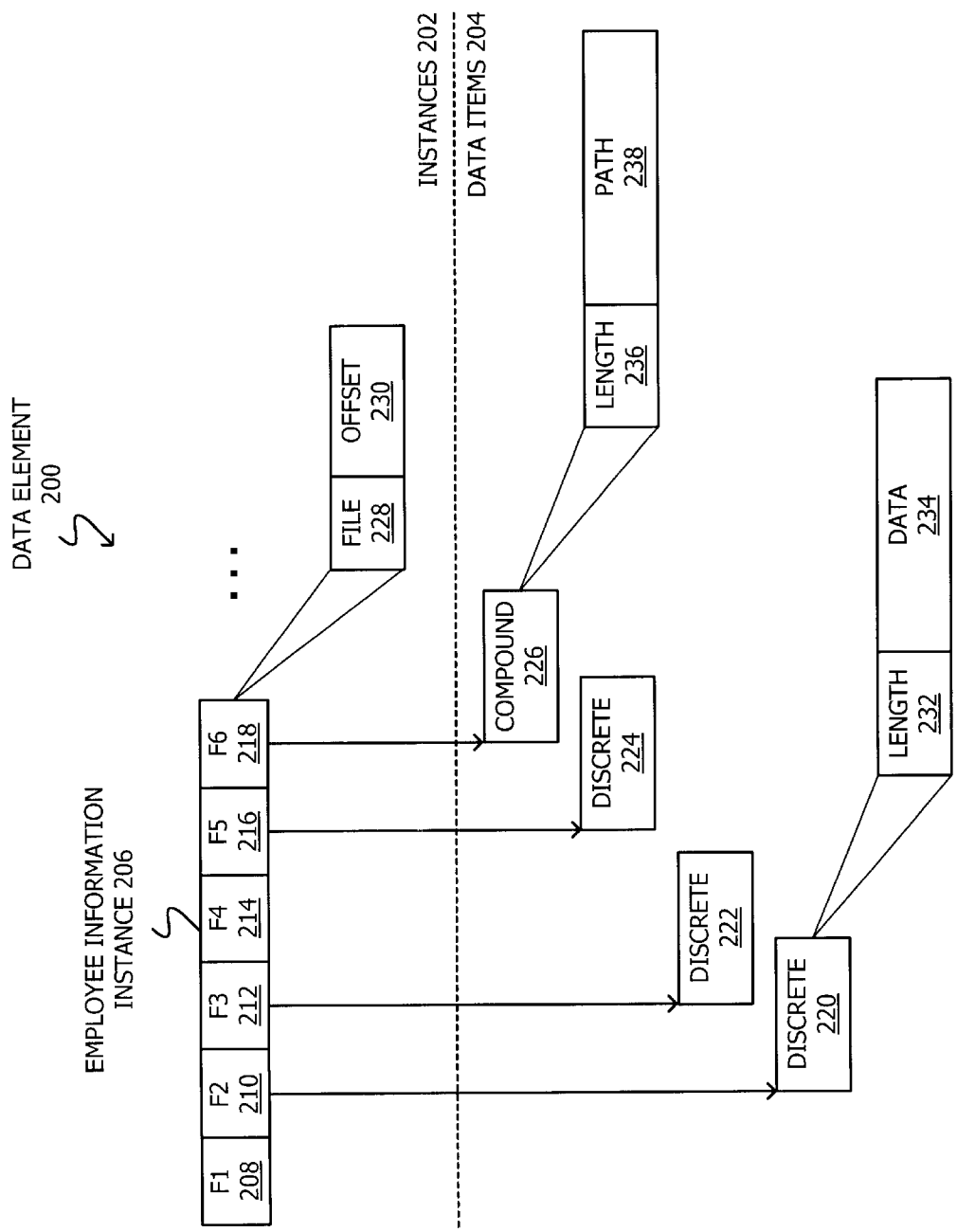
FIG. 2 shows how a database's data element may be partitioned into a collection of instances and a collection data items in accordance with one embodiment of the invention.

Referring to FIG. 2, techniques in accordance with the invention partition a database's data element 200 into a collection of instances 202 and a collection data items 204. Instances 202 incorporate fixed length data and references to variable length data items 204. Illustrative fixed length data include, but are not limited to, character values of a specified length (e.g., 3 bytes), integer values (e.g., 2 and 4 bytes), floating point values (e.g., 4 and 8 bytes), and date and time values (e.g., 8 bytes). Illustrative variable length data items include, but are not limited to, character or text strings (hereinafter referred to as discrete data items) and file objects such as document files, image files, audio files, video or animation files, and spreadsheet files (hereinafter referred to as compound data items).

By way of example, consider employee information instance 206 having fixed length employee number and employment date fields F1 208 and F4 214 respectively, and variable length last name, first name, address, and benefits fields F2 210 (referencing discrete 220), F3 212 (referencing discrete 222), F5 216 (referencing discrete 224), and F6 218 (referencing compound data item 226) respectively. Fixed length instance fields (e.g., fields F1 208 and F4 214) have a length sufficient to store the specified data (2 bytes for an integer or 8 bytes for a date/time entry, for example). Instance fields associated with variable length data items (e.g., fields F2 210, F3 212, F5 216, and F6 218) have a length sufficient to store a data reference. In one embodiment, a data reference (e.g., associated with instance field F6 218) includes a file identification portion 228 and a file offset portion 230. File identification portion 228 identifies the file in which the referenced data item is stored. File offset portion 230 indicates where in the identified file the data item begins. If file identification portion 228 is 1 byte (allowing a total of 255 files) and file offset portion 230 is 4 bytes (allowing 2 Gigabytes off offsets—restricting offset use to positive values), a data reference may directly address more than 500 gigabytes of storage. If file identification portion 228 is allowed to be 2 bytes, a data reference may directly address approximately 128 terabytes of storage. (In addition, file offset portion 230 may be extended to allow increased storage capacity). Thus, using a compact data reference, instances in accordance with the invention may address vast amounts of data storage.

Referring again to FIG. 2, discrete data items (e.g., data item 220) may include a length portion 232 and a data portion 234. In one embodiment, length portion 232 is 2 bytes allowing each discrete object (i.e., data portion 234) to be 64 kilobytes in length. Similarly, compound objects (e.g., data item 226) may include a length portion 236 and a path portion 238. Path portion 238 is used to store a file path to the actual compound data item and may, if length portion 236 is 2 bytes, be up to 64 kilobytes in length. In another embodiment, length portion (232 and/or 236) may be greater (less) than 2 bytes with a commensurate increase (decrease) in the size of the associated data (234) and path (238) portions. It will be recognized, that if a discrete data item is greater than 64 kilobytes in length, it may be stored and treated as a compound data item.

One benefit of partitioning a database's data element in accordance with the invention is that instances become fixed length entities without incurring the wasted memory associated with prior art techniques. In addition, all instances of a specified type (e.g., employee information instances) may be grouped and stored together in blocks. This, in turn, may facilitate data storage, retrieval, backup, and restoration operations. In one embodiment, blocks may correspond to that quanta of memory that is efficiently transferred by a hard disk unit. For example, each block may be 32 kilobytes.

Another benefit of partitioning a database's data element in accordance with the invention is that variable length data items may be packed, grouped and blocked to facilitate efficient storage, retrieval, backup, and error correction operations. In one embodiment, variable length data items associated with a first instance field (e.g., field F2 210) are grouped and stored in a first collection of one or more blocks, while data items associated with a second instance field (e.g., field F3 212) are grouped and stored in a second collection of one or more blocks. (This technique may be particularly advantageous if the chosen block size coincides with the quanta of storage intrinsically manipulated by the underlying data storage devices, e.g., magnetic hard disk devices.)

Yet another benefit of partitioning a database's data element in accordance with the invention is that it provides a convenient structure in which discrete data items need only be stored once, regardless of how many times they are referenced. For example, if discrete data item 220 represents the last name ABCDEFGHIJK (i.e., if the value of length portion 232 is 11 and the value of data portion 234 is the character string "ABCDEFGHIJK"), every instance associated with this data item may use the reference stored in field F2 210—the actual data item need only be stored once. In large database systems, this may provide a significant reduction in the amount of data physically stored.

Instances 202 and variable length data items 204 may be stored in binary packed files on one or more physical storage units. Illustrative storage units include, but are not limited to, magnetic and optical disk units. Storage units may be co-located or spatially distributed and interconnected by a communication link (e.g., a network). In one embodiment, each block within a file is restricted to one "type" of information. That is, while a file may include blocks containing various types of information (e.g., instances, discrete data items, and compound data items), any given block within a file contains data items of a single type (e.g., instances of a single type or discrete data items associated with a single field in an instance). Consider, for example, the illustrative distribution of employee information instances and associated data items shown in Table 2. As indicated, each file may contain data (instances and variable length data items) associated with a plurality of database entries (e.g., employee information instance 206 or instance X), although any given block is restricted to a single type of data (e.g., discrete data items 220, compound data items 226, or instances of type X).

TABLE 2

Illustrative Distribution of Instance and Data Items

| File | Block 1 | Block 2 |
|---|---|---|
| 1 | Employee Information Instance (206) | Discrete Data Item 220 |
| 2 | Discrete Data Item 220 | Discrete Data Item 222 |
| 3 | Discrete Data Item 222 | Discrete Data Item 224 |
| 4 | Discrete Data Item 224 | Compound Data Item 226 |
| 5 | Compound Data Item 226 | Instance X |
| 6 | Employee Information Instance (206) | Variable length Data Associated with Instance X |

Partitioning and blocking a database's data element in accordance with the invention allows an efficient distribution of data (instances and variable length data items) onto physical storage during write operations that may improve a database's access efficiency during read and write operations. For example, if files 1 through 3 of Table 2 are stored on different physical media (each controlled by a separate storage unit control device), a block's worth of employee information instances, a block's worth of discrete data items 220, and a block's worth of discrete data items 222 may be stored or retrieved in parallel. In addition, individual data blocks may be logically rearranged/reorganized for access efficiency without the need to reorganize an entire file. Further, this reorganization may be done via a background process so as to not interfere with ongoing database access operations.

Figure 1:
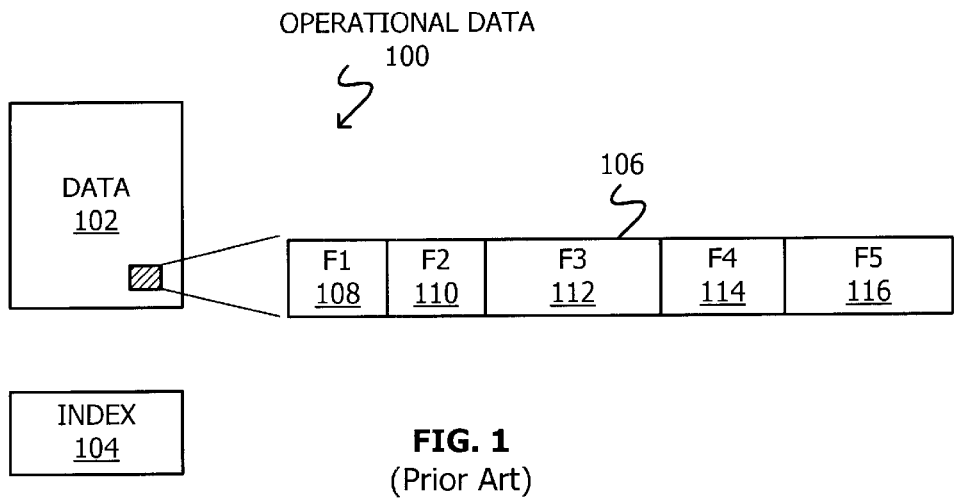
FIG. 1 shows the components of a conventional database's operational data.
Figure 3:
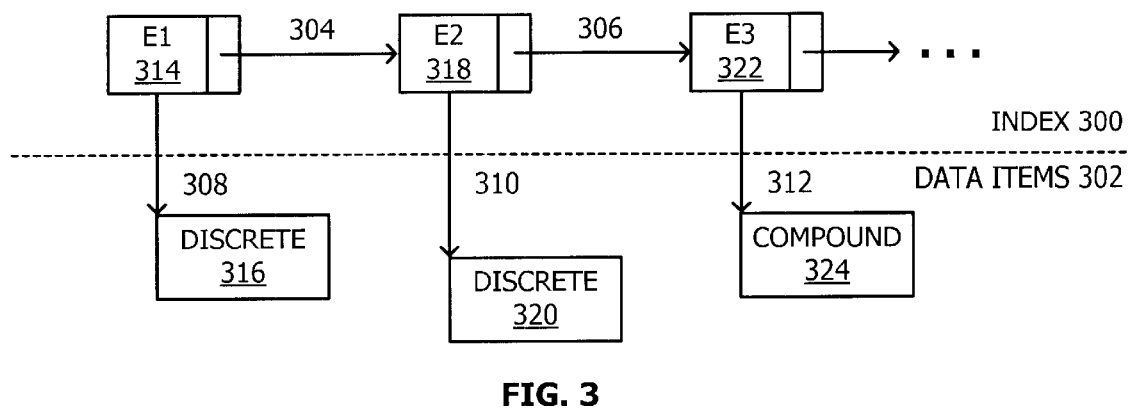
FIG. 3 shows a link list index structure in accordance with one embodiment of the invention.

Blocking techniques may also be applied to a database's index element. Referring to FIG. 3, if index element 300 is implemented as a link list, blocking in accordance with the invention also provides a mechanism to compensate for corrupt pointers (e.g., link list pointer 304 and data pointer 308). Prior art database systems avoided the use of linked list indexes because of the perceived reliability problems associated with pointers: if a pointer was broken (i.e., its value had been corrupted) it was assumed to be an unrecoverable error requiring the entire index to be rebuilt. Blocking in accordance with the invention, however, enables use of link list indexes (providing their attendant benefits, see commonly owned U.S. patent application Ser. No. 09/264,298) and overcomes the long-held belief that link lists are inherently unreliable.

Link list reliability may be thought of as having two aspects: validity and repair. Validity refers to the ability to determine when a pointer is corrupt. Repair refers to the act of determining the pointer's correct value and assigning this value to the previously detected broken pointer. Referring again to FIG. 3, index 300 includes index entry E1 314 (referencing discrete data item 316 via data pointer 308 and index entry E2 318 via link list pointer 304), entry E2 318 (referencing discrete data item 320 via data pointer 310 and index entry E3 322 via link list pointer 306), and index entry E3 322 (referencing compound data item 324 via data pointer 312).

Figure 4:
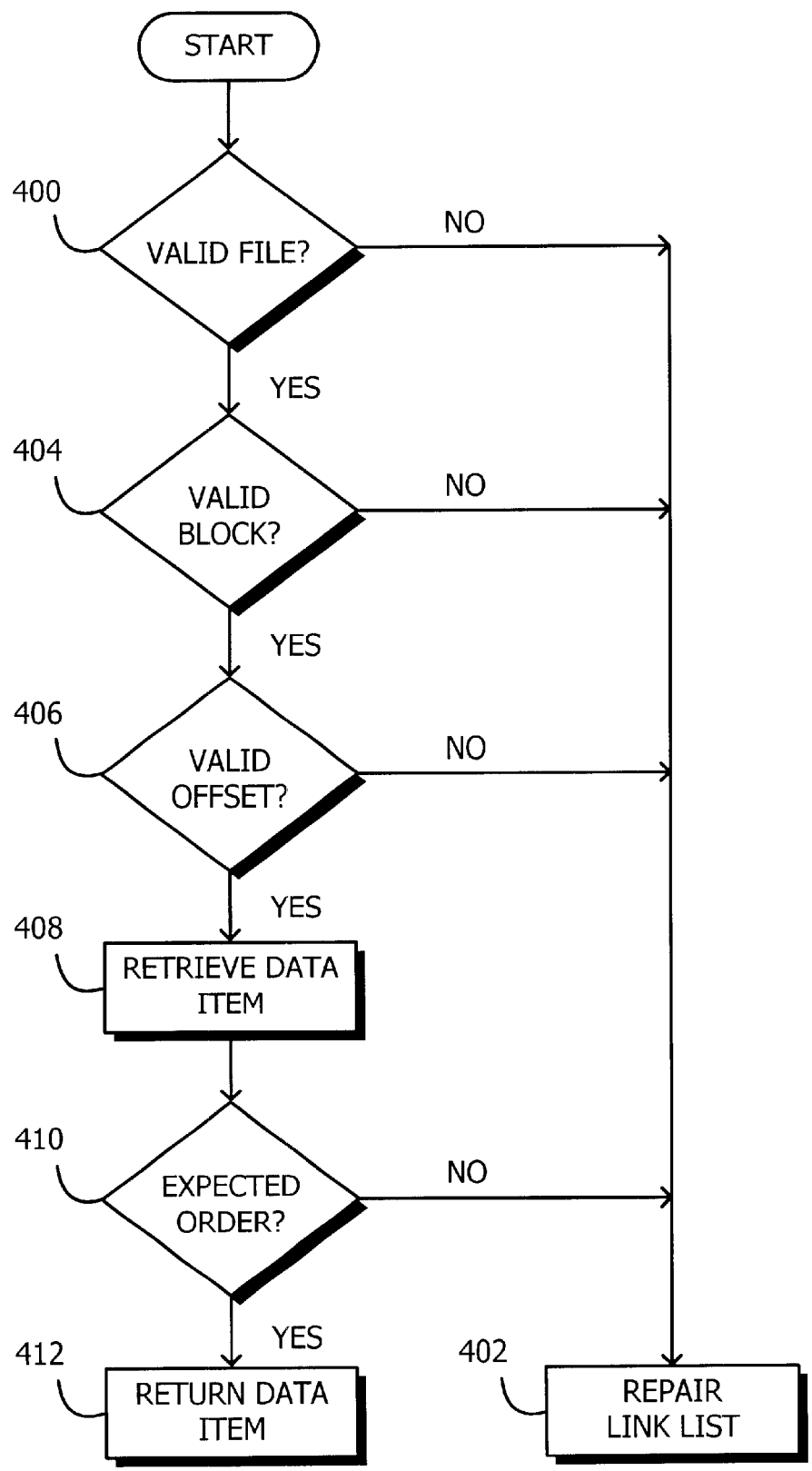
FIG. 4 shows a link list index pointer validation method in accordance with one embodiment of the invention.

Referring to FIG. 4, consider first the validation and repair of link list pointers such as 304 and 306. A first validation check determines if the suspect pointer references an allocated file (diamond 400). In one embodiment, link list pointers have the same structure as data pointers (e.g., 308, 310, and 312). Thus, the pointer's file identification portion (e.g., element 228 in FIG. 2) may be checked to determine if the identified file has been allocated. One of ordinary skill will recognize that system or metadata such as the identification of allocated files and related information (e.g., the number and identification of blocks allocated in each file, and the type of data stored in each block) is typically stored in one or more "system files." If the pointer references a file not yet allocated (the "no" prong of diamond 400), the pointer is broken and repair operations may be initiated (block 402). If the referenced file is a valid file (the "yes" prong of diamond 400), a second validity check may be made to determine if the referenced block within the file has been allocated (diamond 404). If the pointer references a block not yet allocated (the "no" prong of diamond 404), the pointer is broken and repair operations may be initiated (block 402). If the referenced block is a valid block (the "yes" prong of diamond 404), a third validity check may be made to determine if the pointer's offset (e.g., element 230 in FIG. 2) indicates a location within an allocated block (diamond 406). If the offset value does not correspond to a location within the identified block (the "no" prong of diamond 406), the pointer is broken and repair operations may be initiated (block 402). If the offset value corresponds to a location within the identified block (the "yes" prong of diamond 406), the identified data item may be retrieved (block 408) and inspected to determine if it comports with the characteristics of the index being used (diamond 410)—is the retrieved data item in the expected order (numeric or alphanumeric, for example) with respect to immediately prior or immediately subsequent data items or as would be expected from the target data? (As used herein, the terms prior and subsequent refer to the logical ordering of the data items indicated by the index entries.) That is, if the data item sought is a text string whose first character should be "Q," does the retrieved data item comport with this expectation. If the retrieved data item does not follow the expected index progression (the "no" prong of diamond 410) the pointer may be presumed broken and repair operations initiated (block 402). If the retrieved data item follows the expected index progression (the "yes" prong of diamond 410) the retrieved data item may be returned to the requesting process (block 412). The validity checks of FIG. 4 are designed to detect the majority of errors that may occur as a result of a pointer being corrupted—they do not necessarily detect all errors.

Figure 5:
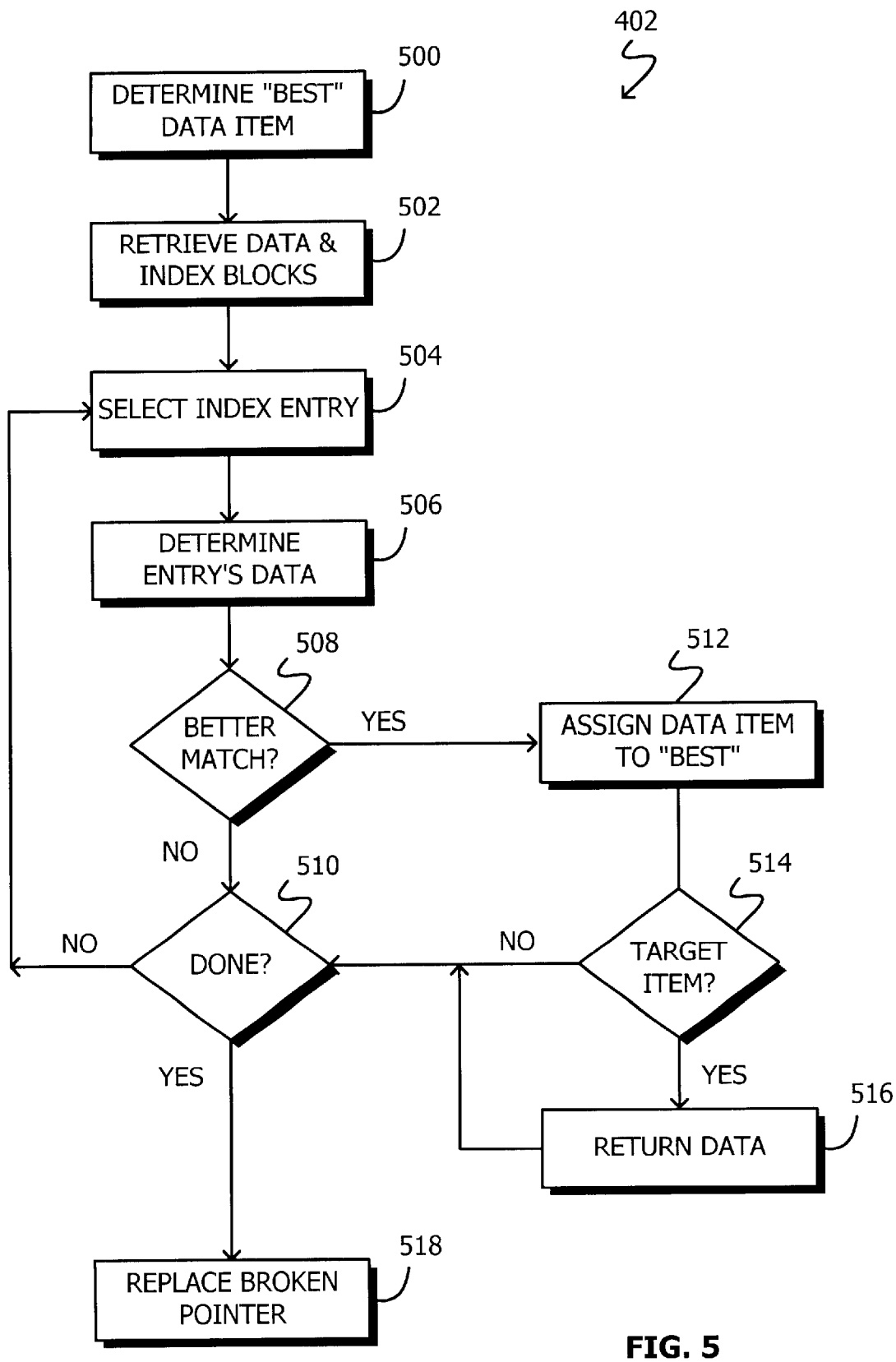
FIG. 5 shows a link list index pointer repair method in accordance with one embodiment of the invention.

Referring now to FIG. 5, a link list pointer repair operation in accordance with one embodiment of the invention is shown. Initially, the data item referenced by the index entry having the broken link list pointer is retrieved and assigned the label "best" (block 500). Next, those file blocks associated with the index and their related data blocks are retrieved (block 502). An initial index entry (e.g., the first index entry) is selected (block 504) and its associated data item is retrieved (block 506). If the retrieved data item is not a better match (vis à vis the ordering dictated by the index) than the current "best" data item (the "no" prong of diamond 508), a check is made to determine if all index entries have been processed (diamond 510). If more entries remain to be processed (the "no" prong of diamond 510), processing continues at block 504. If the data item retrieved during the acts of block 506 is a better match than the current "best" data item (the "yes" prong of diamond 508), it is assigned the label "best" (block 512). If the "best" data item is the data item sought by the index query—the target data item (the "yes" prong of diamond 514), the data item is returned to the requesting process (block 516) and processing continues at diamond 510. If all index entries have been examined (the "yes" prong of diamond 510), the broken pointer is replaced with a reference to the "best" data item (block 518).

Empirical studies have shown that the average size for a discrete data item is approximately 10 bytes. It has further been found that even large databases often contain no more than 10,000 distinct discrete data items of a particular type (e.g., last names). Thus, all discrete data items of a particular type (for even large databases) may be blocked and stored in less than 100 kilobytes—less than 4 32-kilobyte blocks. Four blocks of data plus the blocks associated with the index entries themselves may generally be retrieved into a computer system's working memory. Thus, the acts of FIGS. 4 and 5 to validate and repair a broken link list pointer may be performed in near real-time, executing out of random access memory. In addition, if the data item being sought by a requesting process is determined during a repair operation (the "yes" prong of diamond 514), it may be returned immediately to the requesting process with the remainder of the repair operation proceeding in parallel or background. Thus, user response is not unnecessarily delayed during link list pointer repair operations.

Figure 6:
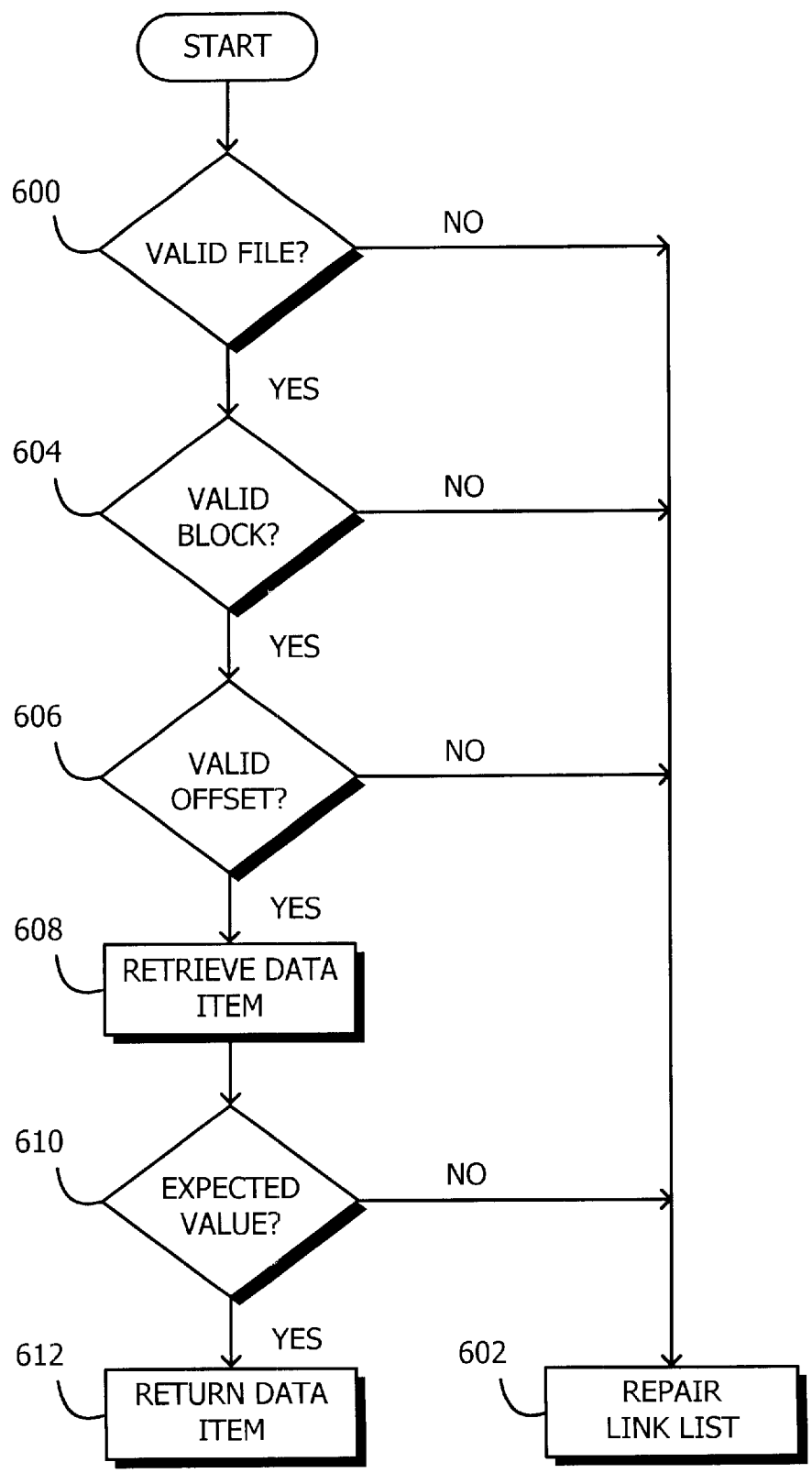
FIG. 6 shows a data pointer validation method in accordance with one embodiment of the invention.

Referring to FIG. 6, consider now the validation and repair of data pointers such as 308, 310, and 312. As in FIG. 4, a first validation check determines if the suspect pointer references an allocated file (diamond 600). If the pointer references a file not yet allocated (the "no" prong of diamond 600), the pointer is broken and repair operations may be initiated (block 602). If the referenced file is a valid file (the "yes" prong of diamond 600), a second validity check may be made to determine if the referenced block within the file has been allocated (diamond 604). If the pointer references a block not yet allocated (the "no" prong of diamond 604), the pointer is broken and repair operations may be initiated (block 602). If the referenced block is a valid block (the "yes" prong of diamond 604), a third validity check may be made to determine if the pointer's offset (e.g., element 230 in FIG. 2) indicates a location within an allocated block (diamond 606). If the pointer references a block not yet allocated (the "no" prong of diamond 606), the pointer is broken and repair operations may be initiated (block 602). If the referenced file block is a valid file block (the "yes" prong of diamond 606), the identified data item may be retrieved (block 608) and inspected to determine if it comports with the characteristics of the data being accessed (diamond 610). For example, if the data item is expected to be a discrete data item whose first X characters are defined by the index entry, the first X characters of the data item may be decoded and inspected. If the retrieved data item does not translate/decode as expected (the "no" prong of diamond 610) the pointer may be presumed broken and repair operations initiated (block 602). If the retrieved data item does translate as expected (the "yes" prong of diamond 610) the retrieved data item may be returned to the requesting process (block 612). The validity checks of FIG. 6 are designed to detect the majority of errors that may occur as a result of a pointer being corrupted—they do not necessarily detect all errors.

Figure 7:
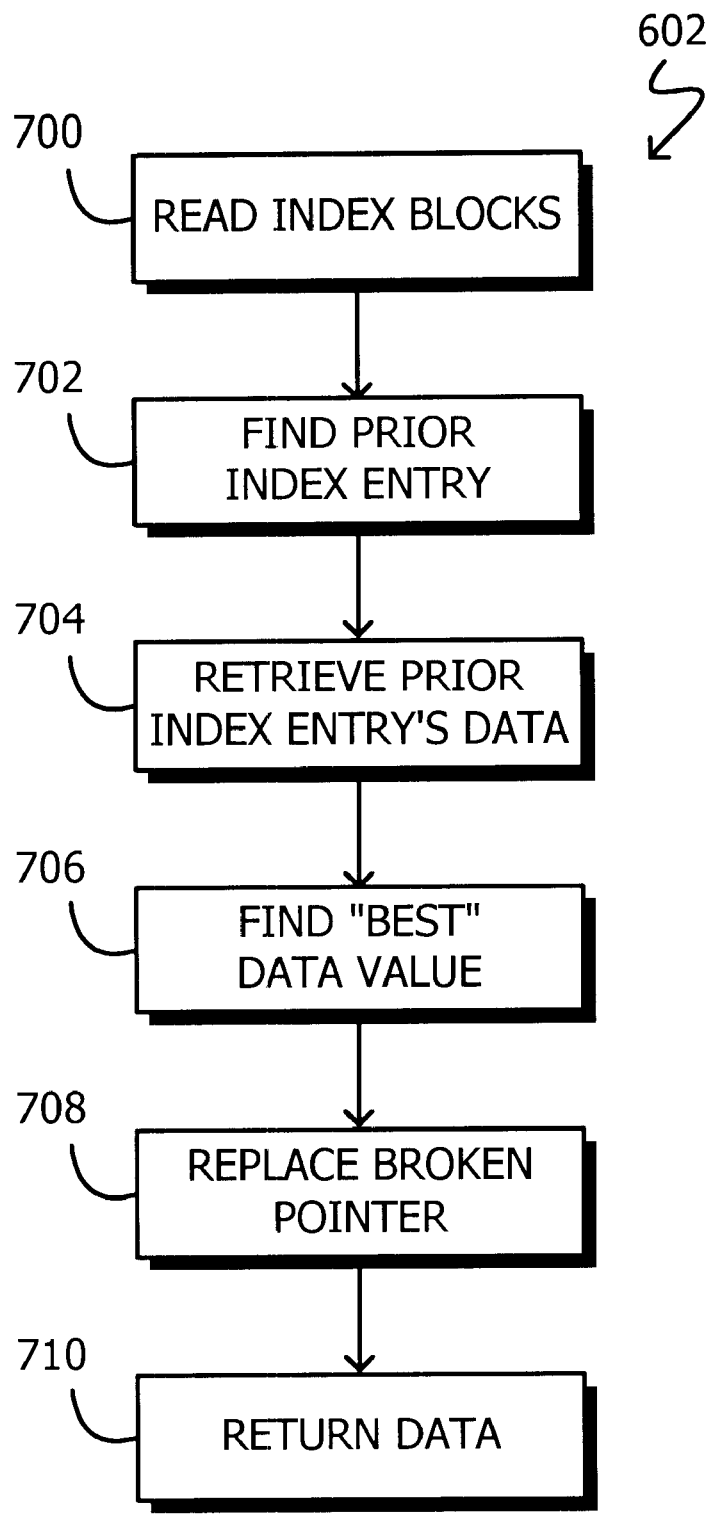
FIG. 7 shows data pointer repair method in accordance with one embodiment of the invention.

Referring now to FIG. 7, a data pointer repair operation in accordance with one embodiment of the invention is shown. Initially, the blocks associated with the data item's index are retrieved (block 700), and that index entry pointing to the entry having the broken data pointer is identified (block 702). Next, the data item referenced by the entry identified during the acts of block 702 is retrieved and assigned the label "best" (block 704)—the retrieved data item represents an initial "best guess" of what data item the broken data pointer should point to. Each data block may now retrieved and searched (sequentially, for example) for that data item that most closely matches the data item labeled "best" as described above in conjunction with FIG. 5 (block 706). To effect repair, the broken pointer is replaced with a reference to that data item identified as "best" (block 708), and the identified data may be returned to the requesting process (block 710).

It will be recognized by one of ordinary skill that errors such as those that corrupt link list pointers typically occur in bursts. Thus, multiple pointers (link list or data) may be corrupted at a single time. The techniques outlined in FIGS. 4, 5, 6, and 7 may be used in a recursive manner to detect and repair multiple pointer errors.

Figure 8:
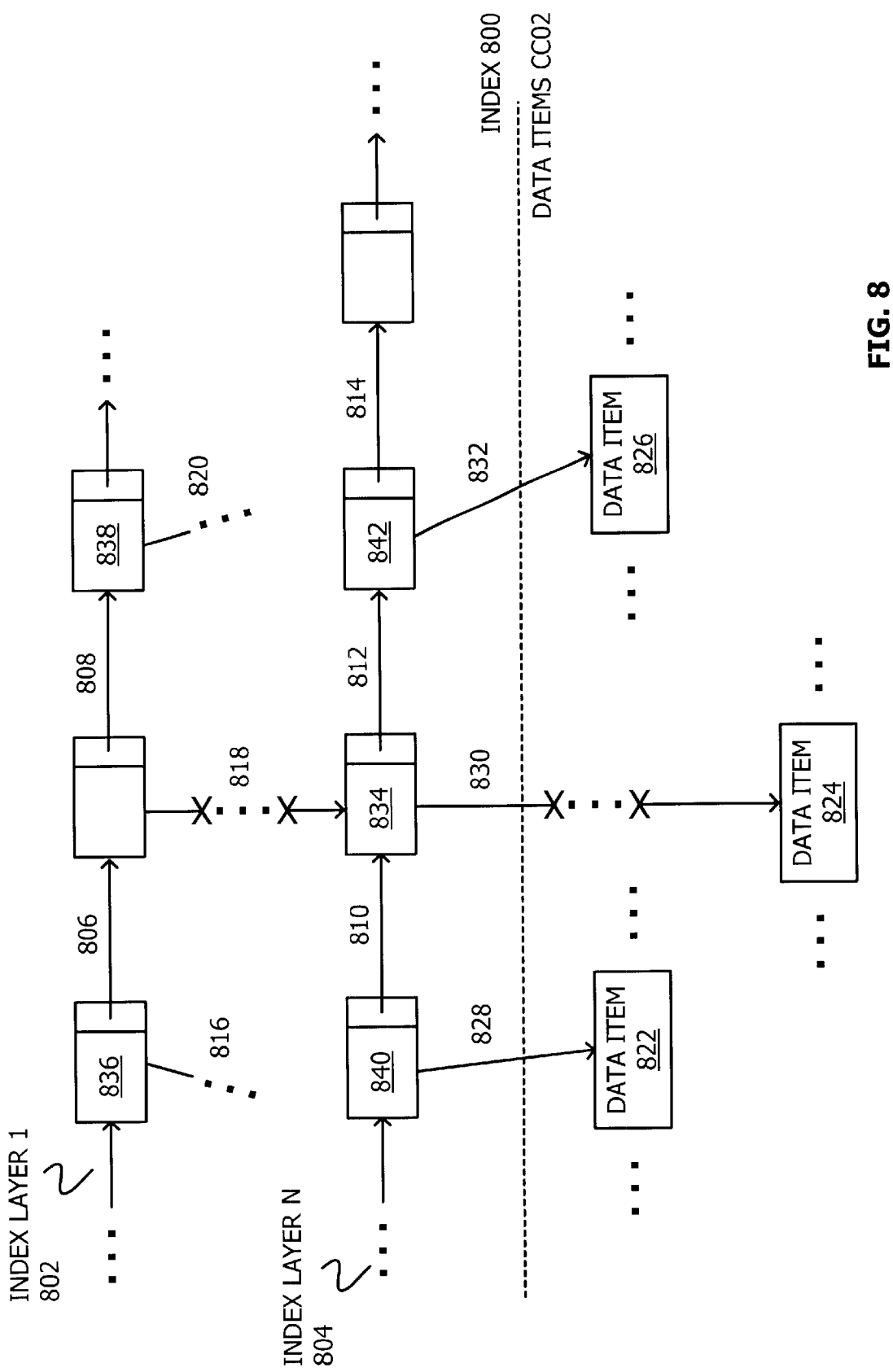
FIG. 8 shows a multi-layered link list index that may be manipulated (used, validated, and repaired) in accordance with the invention.

In one embodiment, index 300 is a multi-layered link list structure as described in commonly owned patent application entitled "Tiered Hashing for Data Access" (Ser. No. 09/264,298). Referring to FIG. 8, a multi-layered link list index 800 may include a first link list index layer 802 and an nth link list index layer 804 (where 'n' may be 2, 3, etc.). Each index layer includes intra-list pointers (e.g., 806, 808, 810, 812, and 814), and each layer that does not directly reference data items 302 (e.g., layer 1 through layer n–1) includes intra-list pointers (e.g., 816, 818, and 820). The final, or nth, layer references data items (e.g., 822, 824, and 826) through data pointers (e.g., 828, 830, and 832).

In a multi-layered link list structure, intra-link list pointers may be validated and repaired in accordance with the techniques described above and in FIGS. 4 and 5. Inter-list pointers may be validated and repaired in accordance with the techniques described above with respect to data pointers (see FIGS. 6 and 7). In this case, the link list elements of the layer being pointed to become the "data." For example, if inter-list pointer 818 becomes corrupt, link list element 834 may be treated as the target "data item" in the repair method of FIG. 7. In addition, a prior link list index layer may be used to bracket those elements of a subsequent link list index layer that need to be retrieved and searched in the event of a corrupt pointer. For example, if layer 804 represents layer 2 of a multi-layered index structure and inter-list pointer 818 becomes broken, layer 1 elements 836 and 838 may be used to bracket those elements of link list layer 804 which need to be retrieved and searched. Similarly, if data pointer 830 becomes corrupt, layer 804 entries 840 and 842 may be used to bracket those data items needed to be retrieved and searched.

Benefits of partitioning the operational storage of a database in accordance with the invention include, but are not limited to, the ability to: organize instances into storage blocks for efficient storage and retrieval operations; organize variable length data into storage blocks for efficient storage and retrieval operations; perform backup and error recovery procedures at the block level rather than file, index, or database level; distribute instances and variable length data among multiple storage units to reduce the frequency of contentions for a specific storage unit; and reduce the number of multiple copies of compound or variable length data objects actually stored.

Figure 9:
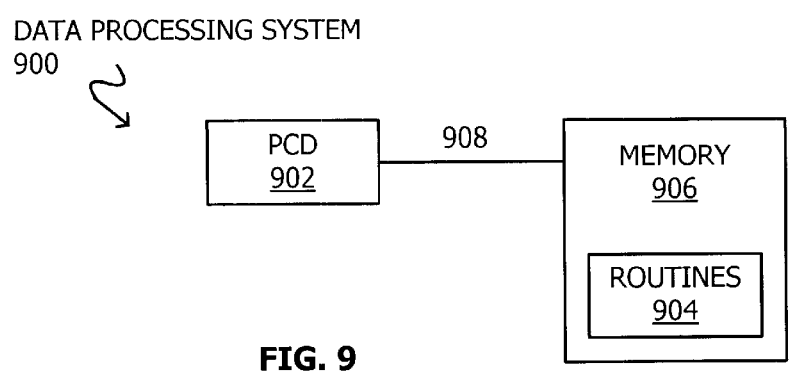
FIG. 9 shows a data processing system in accordance with one embodiment of the invention.

Referring to FIG. 9, acts in accordance with FIGS. 4, 5, 6, and 7 may be performed by data processing system 900 having programmable control device 902 executing instructions organized into one or more program modules (e.g., routines 904). As shown, routines 904 may be stored in memory 906 accessible to programmable control device 902 via communication link 908. Programmable control device 902 may be a single computer processor, a plurality of computer processors coupled by a communications link, or a custom designed state machine. Custom designed state machines may be embodied in a hardware device such as a printed circuit board comprising discrete logic, integrated circuits, specially designed application specific integrated circuits, and field programmable gate arrays. Memory 906 suitable for tangibly embodying program instructions include all forms of non-volatile memory including, but not limited to: semiconductor memory devices such as random access memory (RAM), electrically programmable read only memory (EPROM), electrically erasable programmable read only memory (EEPROM), and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. For example, one of ordinary skill will recognize that acts in accordance with FIGS. 4, 5 and 6 may be done in slightly different orders. By way of example, but not of limitation, validity checks embodied in diamonds 404/604 and 406/606) may be done in reverse order—that is, offset checks of diamonds 406 and 606 may be performed before block validity checks of 404 and 604. It is intended, therefore, that the following claims cover all such modifications and variations that may fall within the true sprit and scope of the invention.

What is claimed is:

1. A memory for storing data for access by a software routine being executed by a programmable control device, comprising:
    a data structure stored in said memory, said data structure including information resident in a database used by said software routine and including:
        an instance structure stored in a first block of said memory, the instance structure containing a fixed-length data item entry and an indicator entry; and a variable length data item stored in a second block of memory separate from said first block of memory, the variable-length data item indicated by the indicator entry, the variable length data item being physically separate from the instance structure.

2. The memory of claim 1, wherein the fixed-length data item entry comprises a numeric entry.

3. The method of claim 2, wherein the numeric entry encodes an integer value.

4. The method of claim 2, wherein the numeric entry encodes a date value.

5. The memory of claim 1, wherein the variable-length data item comprises a character string.

6. The memory of claim 1, wherein the first block and the second block comprise a predetermined quantity of the memory.

7. The memory of claim 6, wherein the predetermined quantity of the memory comprises 32 kilobytes.

8. The memory of claim 1, wherein the memory comprises long-term storage memory.

9. The memory of claim 8, wherein the long-term storage memory comprises magnetic disk memory.

10. A program storage device, readable by a programmable control device, comprising:
   instructions stored on the program storage device for causing the programmable control device to instantiate, in a first block of memory, an instance structure containing a fixed-length data item entry and an indicator entry, the indicator entry indicating a storage location for a variable length data item stored in said memory, the variable length data item being physically stored in a second block of memory, said second block of memory being distinct from the first block of memory.

11. The program storage device of claim 10, wherein the fixed-length data item entry comprises a numeric entry.

12. The program storage device of claim 10, wherein the variable-length data item comprises a character string.

13. A method of storing data in a memory, comprising:
   storing a first data structure in a first block of memory, the first data structure including only zero or more fixed-length data items and a reference to a second data structure; and
   storing a second data structure in a second block of the memory wherein the first and second blocks of memory are distinct, the second data structure including a variable-length data item indicated by the reference.

14. The method of claim 13, wherein the acts of storing comprise storing in blocks of memory that conform in size to that unit of memory efficiently transferred to a long-term storage device.

15. The method of claim 14, wherein the acts of storing to a long-term storage device comprise storing to a magnetic hard-disk drive device.

16. The method of claim 15, wherein the acts of storing comprise storing to blocks of memory that are 32 Kilobytes in size.

17. The method of claim 13, wherein the act of storing a second data structure in the memory comprises:
   storing the variable-length data item; and
   storing a value indicating the length of the variable-length data item.

18. The method of claim 13, wherein the act of storing a reference to a second data structure comprises storing a N-byte pointer to the second data structure.

19. The method of claim 18, wherein the act of storing a N-byte pointer comprises storing a 5-byte pointer having a 1-byte file identification portion and a 4-byte offset portion.

20. A method to validate a pointer element having a file identification portion and a file offset portion, the method comprising:
   determining if the file identification portion indicates an allocated file;
   indicating an invalid pointer condition if the file identification portion indicates an unallocated file; else
   determining if the file offset portion indicates an allocated block in the allocated file; and
   indicating an invalid pointer condition if the file offset portion indicates an unallocated block.

21. The method of claim 20, further comprising the act of retrieving a data item from a location specified by the file identification portion and the file offset portion if the file identification portion indicates an allocated file and the file offset portion indicates an allocated block in the allocated file.

22. The method of claim 20, wherein the act of validating a pointer element comprises validating a pointer from a first link list element to a second link list element.

23. The method of claim 20, wherein the act of validating a pointer element comprises validating a pointer from a link list element to a data element.

24. A program storage device, readable by a programmable control device, comprising:
   instructions stored on the program storage device for causing the programmable control device to validate a pointer element having a file identification portion and a file offset portion, including instructions to
   determine if the file identification portion indicates an allocated file;
   indicate an invalid pointer condition if the file identification portion indicates an unallocated file; else
   determine if the file offset portion indicates an allocated block in the allocated file; and
   indicate an invalid pointer condition if the file offset portion indicates an unallocated block.

25. The program storage device of claim 24, further comprising instructions to retrieve a data item from a location specified by the file identification portion and the file offset portion if the file identification portion indicates an allocated file and the file offset portion indicates an allocated block in the allocated file.

26. The program storage device of claim 24, wherein the instructions to validate a pointer element comprise instructions to validate a pointer from a first link list element to a second link list element.

27. The program storage device of claim 24, wherein the instructions to validate a pointer element comprise instructions to validate a pointer from a link list element to a data element.

28. A method to repair a pointer element in an index entry of an index structure, the index structure having a plurality of entries, the index structure defining an ordering of data items, the method comprising:
   determining a first data item that is referenced by that index entry logically immediately prior to the index entry containing the pointer element;
   retrieving elements of the index structure;
   retrieving data items referenced by the retrieved elements of the index structure;
   identifying a second data item in the retrieved data items that is logically immediately subsequent to the first data item as defined by the ordering established by the index structure; and
   replacing the pointer with a reference to the second data item.

29. The method of claim 28, wherein the act of replacing the pointer comprises replacing a file identification portion of the pointer and a file offset portion of the pointer.

30. The method of claim 28, further comprising:

receiving indication of a target data item from a requesting process prior to performing the act of determining a first data item; and returning the target data item to the requesting process before the act of replacing the pointer.

31. A program storage device, readable by a programmable control device, comprising:

instructions stored on the program storage device for causing the programmable control device to repair a pointer element in an index entry of an index structure, the index structure having a plurality of entries, the index structure defining an ordering of data items, the instructions including instructions to determine a first data item that is referenced by that index entry logically immediately prior to the index entry containing the pointer element;

retrieve elements of the index structure;

retrieve data items referenced by the retrieved elements of the index structure;

identify a second data item in the retrieved data items that is logically immediately subsequent to the first data item as defined by the ordering established by the index structure; and replace the pointer with a reference to the second data item.

32. The program storage device of claim 31, wherein the instructions to replace the pointer comprise instructions to replace a file identification portion of the pointer and a file offset portion of the pointer.

\* \* \* \* \*